Nov. 16, 1937.   R. H. ANDEREGG   2,099,186
EVAPORATOR COIL
Filed Dec. 24, 1935   2 Sheets-Sheet 1
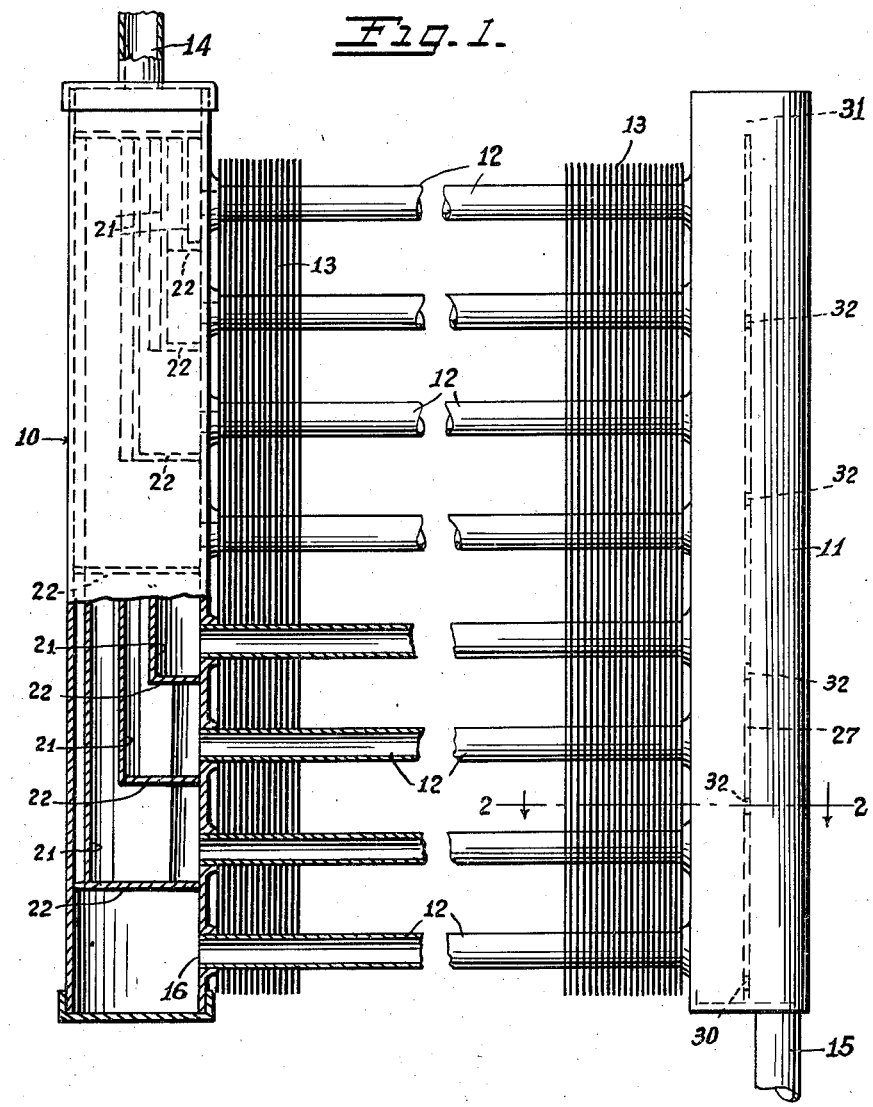
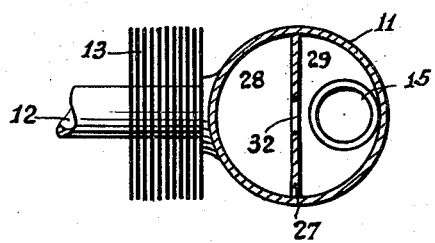
Inventor.
Reuben H Anderegg
By Arthur T. Holmes.
Attorney.

Nov. 16, 1937.  R. H. ANDEREGG  2,099,186
EVAPORATOR COIL
Filed Dec. 24, 1935  2 Sheets—Sheet 2
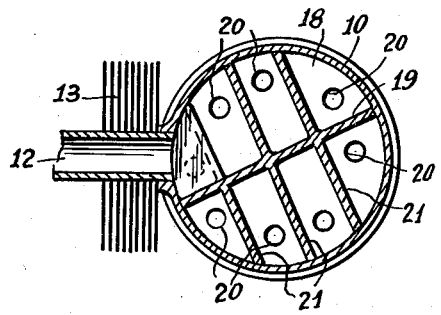
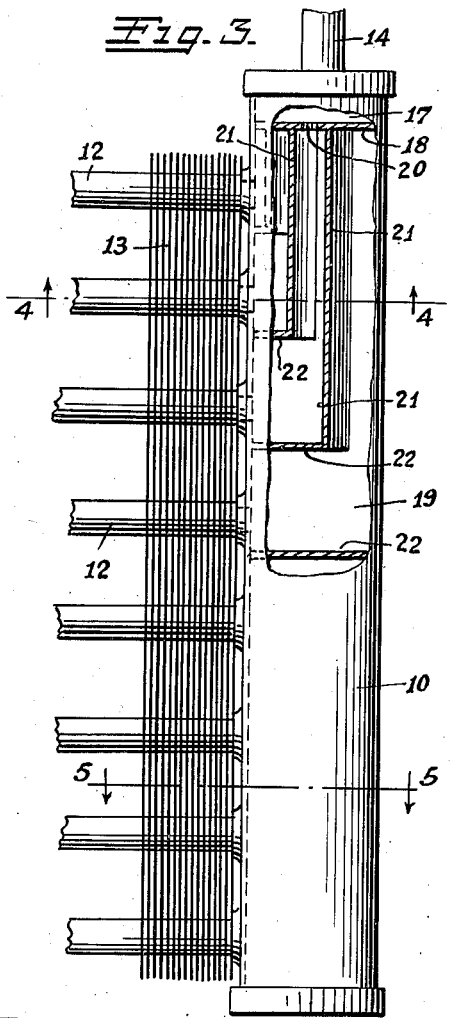
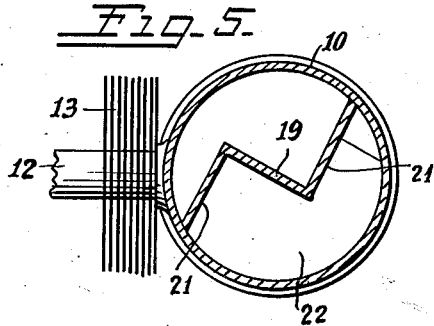
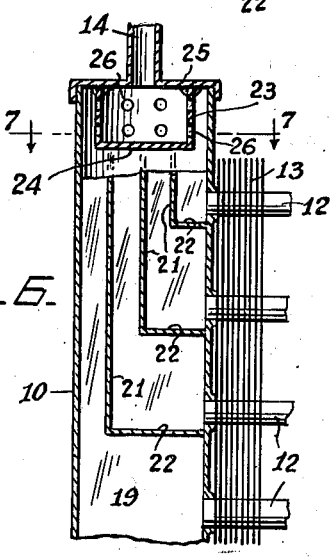
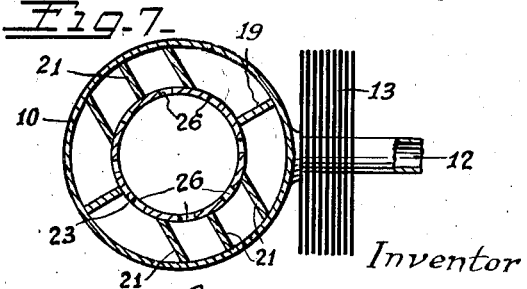
Inventor
Reuben H. Anderegg
By Arthur T. Holmes
Att'y.

Patented Nov. 16, 1937

2,099,186

UNITED STATES PATENT OFFICE 2,099,186

EVAPORATOR COIL

Reuben H. Anderegg, La Crosse, Wis.

Application December 24, 1935, Serial No. 56,034

15 Claims. (Cl. 257—248)

My invention relates to an improvement in an evaporator coil particularly used for air conditioning, and one of the chief objects of my invention is to provide an evaporator coil which will effect a substantially uniform heat exchange throughout the entire coil.

Another object of my invention is to provide means within the inlet header of the coil to equally distribute the refrigerating liquid to the different heat exchange tubes.

Another object of my invention is providing means for so distributing the said liquid, which can be easily inserted within the inlet header.

Another object of my invention is to provide means in the outlet header which will prevent the exit of unevaporated liquid from the coil, thereby preventing said liquid from going back to the compressor.

Another object of my invention is to provide means within the outlet header of said coil to allow the exit of oil from said coil.

The foregoing and many other specific features of my invention are set forth in the following specification, where I describe what I consider the preferred embodiments of my invention.

These are illustrated in the accompanying drawings where—

Fig. 1 is a front view of an evaporator with the tubes and inlet header partly broken away to show internal construction and to show the distributor conduits communicating with the lower group of exchange tubes;

Fig. 2 is a sectional view taken along the line 2—2 of Fig. 1;

Fig. 3 is a rear view of the inlet header, broken away to show the distributor conduits communicating with the upper group of exchange tubes;

Fig. 4 is a sectional view taken along the line 4—4 of Fig. 3;

Fig. 5 is a sectional view taken along the line 5—5 of Fig. 3;

Fig. 6 is a longitudinal sectional view of an inlet header with a modified form of distributor therein;

Fig. 7 is a sectional view taken along the line 7—7 of Fig. 6.

Referring to Fig. 1, which represents an evaporator, the numerals 10 and 11 represent tubular headers connected by the tubes 12 on which are mounted extended fins 13. The header 10 has an inlet 14, and the header 11 an outlet 15. The tubes 12 are preferably aligned and are soldered or welded in the headers, and with reference to header 10 communicate with the interior thereof by means of the apertures 16. It is imperative that the liquid entering the header 10 be evenly distributed to the tubes 12 and for that purpose a distributor is used.

The distributor or core is a casting designed to fit into the header 10. A distributing chamber 17 (Fig. 3) is formed by positioning the distributor with its end wall 18 spaced from the inlet end of the header. A longitudinal baffle 19 which is integral with the end wall 18, fits closely within the header 10, and the end wall is formed with apertures 20 each of which communicates with a separate passage-way whereby the liquid entering the header 10 falls upon the plate, which may be flat, as shown, or cone-shaped. The liquid is thus equally distributed through the apertures 20 to several passage-ways on each side of the longitudinal baffle. If it is desired to vary the proportions of the liquid distributed to different passage-ways, this may be accomplished by making the apertures 20 of varying size.

Each passage-way is formed by walls or flanges 21 which extend outwardly from the longitudinal baffle 19 into contact with the interior wall of header 10. These extend longitudinally of the header and terminate in transverse walls 22 to define separate, adjacent passage-ways, each communicating with one of the tubes 12. Each of the transverse, projecting walls 22 of the distributor where it contacts the tubular wall of the header 10 is arcuate so as to form a tight fit and render it difficult for liquid or gas to pass from one passage to another, as for example is shown in Fig. 5.

The core or distributor is placed within the inlet header and is soldered into place. The walls of the core may have their outer edges soldered to the inner portion of the inlet header or, if desired, the inlet header may be shrunk on the core by heating it, inserting the cold core and cooling the header with the core positioned in it.

Thus, the transverse sector walls of the distributor define passage-ways through which fluid entering the header and passing through the apertures 20, and the longitudinal passages which communicate with them, is distributed to the tubes 12. An equal distribution of liquid to the various apertures and tubes is thereby insured.

An alternative structure is shown in Figs. 6 and 7 wherein a tubular wall 23 defines the distributing chamber. This wall is closed at one end by the wall 24 and its opposite end is open and in communication with the inlet 14 of header 10. In this form of the invention, the tubular wall 23 may be soldered or otherwise affixed to the cap 25 which closes the end of the header. Apertures 26 in the tubular wall 23 are spaced to communicate with the longitudinal passages defined by the central baffle 19 and the walls 21 which radiate from it.

In both forms of the invention herein described, the distributor having been once secured in place within the tubular header, the various passage-ways communicate with the inlet to the respective apertures and insure an equal distribution of liquid to the various apertures and tubes. The distributor can be made in any size and, if necessary, a number of tubes may communicate with each passage-way through a number of apertures. The evaporator is placed in a position for use so that the inlet 14 is at the top, with the distributor in a vertical position so that liquid enters the pipe header at the top inlet and falls upon the distributor plate or into the tubular distributing chamber and then falls through the apertures into the passage-ways.

A portion of the liquid is flashed into gas in the passage-ways and all across the series of tubes, and with a complete heat exchange the liquid is entirely flashed into gas and the gas passes from the evaporator by the outlet 15 to the compressor, not shown. With the header 10 in a vertical position and the inlet 14 at the top, it is apparent that the outlet 15 is at the bottom. It would be preferable to have the outlet at the top of the return header 11 to insure the return only of gas to the compressor, as the return of liquid to the compressor renders the operation of the compressor difficult and inefficient. However, were the outlet so placed at the top, the coil would soon plug up with oil, and between the choice of two evils, it is preferable to have the outlet at the bottom of the return header 11. In order to prevent the return of liquid and at the same time allow the return of oil, a baffle 27 (Figs. 1 and 2) comprising a piece of sheet metal contacting the sides of the return header is inserted in the return header, dividing the return header into two compartments 28 and 29, which communicate with each other by means of a comparatively small passage-way 30 for the passage of oil. The passage-way 31 between the top of the baffle 27 and the top of the return header 11 is of much greater area than the passage-way 30 which is a small circular aperture approximately one-eighth of an inch in diameter, since the volume of gas is large in comparison to that of the oil.

If desired, a number of orifices 32 may be made in the wall 27 to allow the passage of gas from passage 28 to passage 29. The flow of gas through the unit is quite rapid and frequently drops of unevaporated liquid may be carried by the gas. If the orifices are not large the drops of liquid discharged from the tubes will be dashed against the baffle plate 27 preventing their exit through the outlet 15 before evaporation.

The aperture 30 is small enough so that only a small amount of liquid can pass. The result is that if a small quantity of refrigerating liquid does pass through the aperture, there is a sufficient quantity of gas at a high enough temperature passing through the passage 29 to flash such liquid into gas and thus prevent it from returning to the compressor. On the other hand, the aperture 30 is large enough to permit the passage of oil. Tests show that with an equal distribution of refrigerating liquid to the different tubes, as set forth above, the temperature of the heat exchange tubes is much more even than with separate inlets or a common inlet pipe with apertured holes.

While I have described the foregoing preferred embodiments of my invention, I contemplate that many changes may be made without departing from the scope or spirit of my invention.

I claim:

1. A device of the class described, comprising an evaporator having a number of coils, a distributor head comprising a vertically disposed housing, internal walls in said housing forming passageways, a refrigerant inlet chamber in the top of said housing having a number of outlet orifices, means whereby the refrigerant is discharged into said passageways, through individual said orifices, and discharged from each said passageway to the inlet end of one of said coils.

2. In an evaporator, the combination of substantially vertical inlet and outlet headers having apertures therein, heat exchange tubes connecting said headers through said apertures, said inlet header having an inlet at the top, and a distributing chamber below and adjacent said inlet, there being orifices in a wall of said distributing chamber, and means cooperating with said inlet header to form a plurality of separate passageways connecting separate orifices in said chamber with said heat exchange tubes.

3. In an evaporator, the combination of substantially vertical inlet and outlet headers having apertures therein, heat exchange tubes connecting said headers through said apertures, said inlet header having an inlet at the top, a member positioned in said inlet header and having orifices therein, and a metallic core in said header forming vertical passageways therein in communication with separate heat exchange tubes and with said orifices.

4. In an evaporator, the combination of substantially vertical inlet and outlet headers having apertures therein, heat exchange tubes connecting said headers through said apertures, the said inlet header having an inlet in its top and a distributing chamber therebelow, internal walls in said inlet header forming passageways leading to the respective heat exchange tubes, the said distributing chamber having a plurality of orifices in communication with such passageways to establish separate paths of flow through the said heat exchange tubes.

5. In an evaporator, the combination of substantially vertical inlet and outlet headers having apertures therein, finned heat exchange tubes connecting said headers through said apertures, the said inlet header having an inlet in its top, a metallic core inserted in said inlet header and in cooperation therewith forming vertical passageways communicating with separate apertures, and means between the inlet and said passageways to distribute heat exchange fluid into said passageways and into the heat exchange tubes.

6. In an evaporator, the combination of substantially vertical inlet and outlet headers having apertures therein, finned heat exchange tubes connecting said headers through said apertures, the said inlet header having an inlet at its top, and a core having a plurality of substantially vertical walls and horizontal section walls forming in cooperation with said inlet header a plurality of vertical passageways connecting with horizontal passageways, as defined by the horizontal section walls, in communication with the separate heat exchange tubes.

7. In an evaporator, the combination of substantially vertical inlet and outlet headers having apertures therein, finned heat exchange tubes connecting said headers through said apertures, the bottom of the outlet header having an outlet therein, a vertical wall in the outlet header forming a U-shaped gas passage, said wall being provided at its bottom with means to allow the passage of oil therethrough.

8. In an evaporator, the combination of substantially vertical inlet and outlet headers having apertures therein, finned heat exchange tubes connecting said headers through said apertures, a vertical wall in the outlet header forming an ascending and descending gas passage, the outlet header having an outlet at the bottom of the descending passage, and said wall having an oil escape orifice in its bottom.

9. In an evaporator, the combination of substantially vertical inlet and outlet headers having apertures therein, finned heat exchange tubes connecting said headers through said apertures, a vertical wall in the outlet header forming an ascending and a descending gas passage, the outlet header having an outlet at the bottom of the descending passage, said wall having an oil escape orifice in its bottom and gas escape orifices thereabove.

10. In an evaporator, the combination of substantially vertical inlet and outlet headers having apertures therein, finned heat exchange tubes connecting said headers through said apertures, the inlet header having an inlet at its top and a distributing chamber below and adjacent such inlet with orifices therein, means within said inlet header providing a plurality of separate vertical passageways connecting separate orifices in said distributing chamber with said apertures, a vertical wall in the outlet header forming an ascending and descending gas passage, the outlet header having an outlet at the bottom of the descending passage, and said wall having an oil escape orifice in its bottom.

11. In an evaporator, the combination of substantially vertical inlet and outlet headers having apertures therein, finned heat exchange tubes connecting said headers through said apertures, the inlet header having an inlet at the top thereof, a metallic core inserted in the inlet header and in cooperation with said inlet header forming vertical passageways in communication with separate apertures, means between the inlet and said passageways to distribute heat exchange liquid into said passageways, a vertical wall in the outlet header forming an ascending and a descending gas passage, the outlet header having an outlet at the bottom of the descending gas passage and said wall having an oil escape orifice in its bottom.

12. In an evaporator, the combination of substantially vertical inlet and outlet headers having apertures therein, finned heat exchange tubes connecting said headers through said apertures, the inlet header having an inlet at the top thereof, a metallic core having a plurality of substantially vertical walls and horizontal sector walls forming in cooperation with said inlet header a plurality of vertical passageways connecting with horizontal passageways in communication with separate heat exchange tubes, a vertical wall in the outlet header forming an ascending and a descending gas passage, the outlet header having an outlet at the bottom of the descending passage, and said wall in the outlet header having an oil escape orifice in its bottom.

13. In an evaporator, the combination of substantially vertical inlet and outlet headers having apertures therein, finned heat exchange tubes connecting said headers through said apertures, the inlet header having an inlet at its top and a distributing chamber therebelow formed with a plurality of orifices, means within said inlet header providing a plurality of separate vertical passageways connecting separate orifices in said chamber with said apertures, a vertical wall in the outlet header forming an ascending and a descending gas passage, the said outlet header having an outlet at the bottom of the descending gas passage, and the said wall in the outlet header having an oil escape orifice in its bottom and gas escape orifices thereabove.

14. In an evaporator, the combination of inlet and outlet tubular headers having apertures therein, heat exchange tubes connecting said headers through said apertures, a separate metallic core with outwardly extending walls cooperating with the wall of said header to define a liquid separating chamber within said header adjacent said inlet and forming separate passageways connecting said distributing chamber with said apertures.

15. In an evaporator, the combination of inlet and outlet tubular headers having apertures therein, heat exchange tubes connecting said headers through said apertures, a separate metallic core with outwardly extending walls, said walls each having an arcuate edge cooperating with the tubular wall of the header to form separate passageways, and an apertured element within said inlet header at the end of said core to define a liquid distributing chamber within the inlet header adjacent the inlet thereof, whereby liquid will be distributed to the separate passageways and thence to the separate heat exchange tubes.

REUBEN H. ANDEREGG.